Patented Sept. 22, 1931

1,823,921

UNITED STATES PATENT OFFICE

HANS TOCHTERMANN, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

COLORING RUBBER

No Drawing. Application filed April 8, 1929, Serial No. 353,661, and in Germany April 28, 1928.

The present invention relates to the coloring of rubber and like materials.

Generally speaking, rubber has been colored hitherto by rolling dry powdered coloring materials into the compounded rubber mixture before vulcanization.

I have now found that natural rubber and the like masses or materials having similar properties such as guttapercha, balata or the products possessing similar properties obtained by a polymerization of diolefines, all of which materials are hereinafter referred to as "rubber-like masses", can be colored particularly deep and brilliant shades by incorporating therewith a desired dyestuff or a water-insoluble salt thereof, or an inorganic pigment or several of these, that is, a water-insoluble coloring matter, in the form of an aqueous paste or suspension, containing a small quantity of one or more organic difficultly volatile substances dissolved, suspended or emulsified in the water forming a constituent of the coloring matter paste or suspension. The said difficultly volatile organic substances should possess a boiling point above 100° C. and may be chosen for example from alcohols, such as butyl or benzyl alcohol, glycol, glycerol, cyclohexanol and the like, or esters, such as glycerol acetates, or triaryl phosphates, ethers, such as ethylene glycol alkyl or aryl ethers, ketones, such as cyclohexanone, amines, such as alkyl amines, triethanol or other alkylol amines, xylidines and the like, hydrocarbons, such as solid or liquid paraffin wax, xylene or mineral oils and the like, natural vegetable or animal fats or waxes or sulphonation products of the latter, which may be sulphuric esters or true sulphonic acids, such as Turkey red oil, soaps and many others. Preferably such organic substances are used, as are more difficultly evaporated than water. They may be added to the rubber-like mass simultaneously with the coloring matter paste, or, as is preferred, may be added to the paste before the incorporation with the rubber-like mass. The addition of the said substances has the great advantage that the coloring matters which are present in the pastes in a state of extremely fine distribution, are continuously maintained in this state.

It is often advantageous to incorporate with the rubber-like mass excessively large quantities of the coloring matter, for example 10 per cent or more of the uncolored rubber-like mass. The resulting products can be used with great advantage for the coloring of further quantities of rubber-like masses by incorporating them with uncolored masses of the said kind.

The products obtained according to the present invention may also contain other substances, for example the additions usual in the rubber industry, such as soot, sulphur, zinc oxide, vulcanization accelerators, agents preventing ageing, and the like.

It is advantageous to proceed by rolling the coloring matter paste into the fundamental rubber mixture. It is preferable to employ dyestuffs and color lakes which have the greatest stability in the presence of the agents which are to be employed for the vulcanization and in the application of heat during the vulcanization.

The following examples will further illustrate the nature of this invention but the invention is not restricted to these examples. The parts are by weight.

Example 1

25 parts of Brilliant indigo 4G (Schultz Farbstofftabellen, 6th edition No. 887) in the form of a 20 per cent aqueous paste, to which 5 parts of propyl alcohol have been added, are rolled into a mixture of 100 parts of crêpe rubber, 50 parts of heavy spar, 30 parts of lithopone, 12 parts of zinc white, 4 parts of flowers of sulphur and 0.2 part of a vulcanization accelerator, by means of mixing rollers, while avoiding a strong increase in temperature. The whole is rolled until the small quantity of water which has not separated out, has evaporated, and is then vulcanized for 30 minutes under a pressure of 3.5 atmospheres.

Instead of the aforesaid coloring matter, an aqueous paste of antimony pentasulphide may be used.

Example 2

150 parts of a 28 per cent aqueous paste of 6-chlor-3-amino-1-methylbenzol-4-sulphonic acid azo-β-naphthol are mixed with 8 parts of Turkey red oil and rolled into 100 parts of crêpe rubber. The resulting mixture is dried by hanging in the air over night. 10 parts of the product are then rolled into the fundamental mixture described in Example 1, and the whole is then vulcanized in the manner described in Example 1.

Instead of Turkey red oil as addition to the dyestuff paste, use may also be made of ethylene glycol mono-ethyl ether or of glycerol diacetate alone or in mixture with butyl alcohol.

Example 3

50 parts of a 20 per cent paste of a water insoluble salt, obtained by precipitation of cotton scarlet extra (Schultz Farbstofftabellen No. 227) with barium chloride, are freed from water as far as possible by filtration by suction, stirred with 15 parts of an aqueous emulsion of wool grease, and are then poured into a mixture of 100 parts of smoked sheets, 30 parts of zinc white, 3.5 parts of sulphur and 0.5 part of a vulcanization accelerator while rolling the same. The whole is rolled until an intimate and thorough mixing has been effected and is then vulcanized for 50 minutes under a pressure of 4 atmospheres.

Instead of aqueous wool grease emulsion, a suspension of paraffin wax in water prepared with the aid of propylated naphthalene sodium sulphonate may be employed as well.

What I claim is:—

1. The process of coloring rubber-like masses which comprises incorporating therewith prior to vulcanization a coloring matter in the form of an aqueous paste and a difficultly volatile organic substance.

2. The process of coloring rubber-like masses which comprises incorporating therewith prior to vulcanization a coloring matter in the form of an aqueous paste containing a difficultly volatile organic substance.

3. The process of coloring rubber-like masses which comprises incorporating therewith prior to vulcanization a coloring matter in the form of an aqueous paste containing a glycol-mono-alkyl ether.

4. The process of coloring rubber-like masses which comprises incorporating therewith prior to vulcanization a coloring matter in the form of an aqueous paste containing ethylene glycol mono-ethyl ether.

5. A composition of matter comprising an unvulcanized rubber-like mass, a coloring matter in the form of an aqueous paste and a difficultly volatile organic substance.

6. A composition of matter comprising an unvulcanized rubber-like mass, a coloring matter in the form of an aqueous paste, in an amount of at least 10 per cent by weight of the rubber-like mass, and a difficultly volatile organic substance.

7. A composition of matter comprising an unvulcanized rubber-like mass, a coloring matter in the form of an aqueous paste, in an amount of at least 10 per cent by weight of the rubber-like mass, and a glycol-mono-alkyl ether.

8. A composition of matter comprising an unvulcanized rubber-like mass, a coloring matter in the form of an aqueous paste, in an amount of at least 10 per cent by weight of the rubber-like mass, and ethylene glycol mono-ethyl ether.

In testimony whereof I have hereunto set my hand.

HANS TOCHTERMANN.